(12) United States Patent
Unice et al.

(10) Patent No.: US 11,859,761 B2
(45) Date of Patent: Jan. 2, 2024

(54) CONTROLLED MOTION OPTICS PLATFORMS

(71) Applicants: Scott Unice, Lindon, UT (US); Weston Unice, Lindon, UT (US); Lowe Unice, Lindon, UT (US); Cole Unice, Lindon, UT (US)

(72) Inventors: Scott Unice, Lindon, UT (US); Weston Unice, Lindon, UT (US); Lowe Unice, Lindon, UT (US); Cole Unice, Lindon, UT (US)

(73) Assignee: Scott Unice, Lindon, UT (US)

( * ) Notice: Subject to any disclaimer, the term of this patent is extended or adjusted under 35 U.S.C. 154(b) by 51 days.

(21) Appl. No.: 17/557,610

(22) Filed: Dec. 21, 2021

(65) Prior Publication Data

US 2023/0194047 A1    Jun. 22, 2023

(51) Int. Cl.
| | |
|---|---|
| *F16M 13/02* | (2006.01) |
| *G03B 17/56* | (2021.01) |
| *G02B 23/16* | (2006.01) |
| *F16M 11/18* | (2006.01) |
| *F16M 11/20* | (2006.01) |
| *F16M 11/10* | (2006.01) |

(52) U.S. Cl.
CPC .......... *F16M 13/022* (2013.01); *F16M 11/10* (2013.01); *F16M 11/18* (2013.01); *F16M 11/2021* (2013.01); *F16M 11/2078* (2013.01); *G02B 23/16* (2013.01); *G03B 17/561* (2013.01)

(58) Field of Classification Search
CPC ...... F16M 13/022; F16M 11/10; F16M 11/18; F16M 11/2021; F16M 11/2078; G02B 23/16; G03B 17/561
USPC ....................................... 248/278.1
See application file for complete search history.

(56) References Cited

U.S. PATENT DOCUMENTS

| | | | |
|---|---|---|---|
| 2,563,389 A | 8/1951 | Blum | |
| 2,717,138 A | 9/1955 | Sheehan | |
| 2,948,501 A | 8/1960 | Heling | |
| 4,234,149 A * | 11/1980 | Kawazoe | ............... F16M 11/28 |
| | | | 248/184.1 |
| 4,457,610 A | 7/1984 | Kawazoe | |
| 5,365,293 A | 11/1994 | Nakatani | |
| 6,644,871 B2 * | 11/2003 | Nakatani | ............... F16M 13/00 |
| | | | 396/428 |
| 6,739,559 B2 * | 5/2004 | Nakatani | ............... F16M 11/24 |
| | | | 396/419 |
| 6,991,384 B1 | 1/2006 | Davis | |
| 9,873,244 B1 * | 1/2018 | Jurman | .................... B25B 5/06 |
| 10,775,683 B1 | 3/2020 | Hallett | |
| 10,754,228 B2 | 8/2020 | Johnson, Sr. | |
| 2006/0131467 A1 * | 6/2006 | Wang | .................... F16M 11/40 |
| | | | 248/206.2 |

* cited by examiner

*Primary Examiner* — Muhammad Ijaz
(74) *Attorney, Agent, or Firm* — Nathan G. Guymon, Esq.; Bamert Regan PLLC (57) ABSTRACT

An optics platform includes a base plate, a swing arm pivotally attached to the base plate so as to articulate in a semi-circular motion around a vertical axis on the base plate. The optics platform further includes a pivot arm that is pivotally attached to the swing arm so as to articulate in a semi-circular motion around a horizontal axis of the swing arm.

18 Claims, 12 Drawing Sheets

CONTROLLED MOTION OPTICS PLATFORMS

BACKGROUND

Photography enthusiasts may aspire to capture a unique or otherwise inspiring scene while exploring the outdoors and observing nature. A well-positioned camera can be paramount in the difference between obtaining a frame-worthy photo or a photo that is to be discarded.

DETAILED DESCRIPTION

The following relates to platforms that support micro motion optics. Particularly, platforms are desirable that support fine movements of optics devices, such as telescopes, cameras, and other devices. Fine motion may be desirable to enable high magnification of such devices. Even small movements caused by environmental forces, such as wind, vibration, or other forces, may move a device enough to make it difficult to focus on a relatively nearby small object or an object that is a long distance away. However small the movement, a lost view may make it difficult to relocate with the lens.

The optics platform described herein allows for small incremental motion to yield fine optics adjustments. This includes sweeping adjustments provided by semi-circular horizontal and vertical movement. Such movement is especially useful for high magnification or precise focusing of devices such as telescopes, spotting scopes, cameras, or other optics devices. The optics platform described herein allows for ease in centering an image and following an object using fine adjustment capabilities.

An example optics platform includes a base plate with a swing arm pivotally attached to the base plate. The attachment allows the swing arm to articulate in a semi-circular motion around a vertical axis of the base plate. A pivot arm is pivotally attached to the swing arm to articulate in a semi-circular motion around a horizontal axis of the swing arm. The movement of the swing arm and the pivot arm may be performed simultaneously or independently of each other.

In an example, a first harness is used to constrain the semi-circular movement of the swing arm to a horizontal plane relative to the base plate. In an example, the first harness comprises an interlocking end member on the swing arm and base plate. The interlocking end member is to interlock the swing arm with the base plate. In an example, the interlocking end member includes a notch on the swing arm and a lip on the base plate.

In an example, a second harness is used to constrain semi-circular movement of the pivot arm to a vertical plane relative to the swing arm. In an example, the second harness comprises an interlocking end member to interlock the pivot arm with the swing arm. In an example, the interlocking end member includes sidewalls of the swing arm and the elongate member of the pivot arm. In other examples, the first and second harness include other types of structure, including barrel nuts and other structure that restricts movement between the base plate, swing arm, and pivot arm.

In an example a first biasing member is to counter a force on the swing arm in the horizontal plane relative to the base plate. A second biasing member is to counter a force on the pivot arm in the vertical plane relative to the swing arm. In an example, the first and second biasing members include springs. The spring of the first biasing member is configured to provide a counter tension against the swing arm movement. The spring of the second biasing member is configured to provide a counter tension against the pivot arm movement.

In an example, the force on the swing arm is provided by a windage knob that is threaded through a sidewall of the base plate. In an example, the force on the pivot arm is provided by an elevation knob that is threaded through the swing arm. In an example, the pivot arm further includes a top plate that is to support an external device.

In an example, the base plate includes a ball mount attachment on a bottom side of the base plate. The ball mount attachment is to attach to a standard tripod.

In an example, the base plate comprises a base spring hole and a base pivot hole within the base spring hole. A base pin within the base pivot hole pivotally attaches the swing arm to the base plate. A base spring within the base spring hole is configured to apply a spring counter tension against a force applied to articulate the swing arm around the base pin and base plate. The counter tension on the swing arm enables a precisely controlled movement of the swing arm.

In an example, the base plate includes a pie-shaped, wedge-shaped, or otherwise triangular base. A base pivot hole is located at or near an apex of the pie-shaped base. A swing pivot hole is located on an underside of the swing arm. The base pivot hole and the swing pivot hole are in alignment. The base pin being inserted within the base pivot hole and the swing pivot hole pivotally attaches the base plate and the swing arm.

In another example, the base plate includes a pie-shaped base. A windage knob is located at or near a corner end of the pie-shaped base. A windage knob is screwed through the base plate to contact a side of the swing arm and provide a force that facilitates the semi-circular motion of the swing arm, the semi-circular motion being parallel to a planar surface of the base plate.

In an example, the swing arm includes an elongate member having a swing pivot hole at or near one end that aligns with a base pivot hole of the base plate for providing a vertical axis on which the swing arm articulates relative to the base plate. In an example, the swing arm includes an offset member that extends perpendicularly outward from the elongate member. A notch on the offset member slidably engages around an end of the base plate. The notch is to hold the swing arm slidably engaged while the swing arm articulates about the base plate.

In an example, the pivot arm includes an arm extension that pivotally attaches to the swing arm. A top plate at the end of the pivot arm is to support at least one external device. In an example, the attachment is accomplished with a pivot attachment on a bottom side of the arm extension. A force exerted at or near an end of the arm extension causes the pivot arm to articulate around the pivot attachment.

In an example, the pivot arm includes a biasing member to provide a counter force to the force applied at or near an end of the arm extension of the pivot arm. The force and counter force enable a fine-tuned, precise movement and position of the pivot arm relative to the swing arm. In an example, the biasing member includes a pivot spring held between a pivot spring hole on the pivot arm and a swing spring hole on the swing arm. The pivot spring is configured to provide the counter force to the force applied at or near the end of the arm extension of the pivot arm.

In an example, an optics platform includes a base plate that includes a generally flat pie-shaped base member with at least one sidewall on a side of the base plate. The optics platform further includes a swing arm that is pivotally attached to the base plate to articulate in a semi-circular motion around a vertical axis of the base plate. A pivot arm is pivotally attached to the swing arm to articulate in a semi-circular motion around a horizontal axis of the swing arm. A top plate is attached to the pivot arm and is to support at least one external device.

In an example, a first harness is to constrain movement of the swing arm to be in a horizontal plane relative to the base plate. The first harness includes a windage knob on a sidewall at or near a corner end of the base plate. A horizontal force on the swing arm is provided by a windage knob that is threaded in and out of the sidewall of the base plate. A base spring hole is located at or near an apex of the pie-shaped base of the base plate. The base spring hole is to contain a base spring that provides counter tension to the horizontal force applied by the windage knob. A base pivot hole within the base plate includes a base pin therethrough which pivotally attaches the base plate and the swing arm. The base pin provides a vertical axis for the swing arm to articulate relative to the base plate. The swing arm includes a notch that slidably engages around an end of the base plate and thereby isolates the swing arm from vertical movement.

A second harness includes a pivot attachment on a bottom side of the pivot arm to pivotally attach the pivot arm to the swing arm. A force on the pivot arm is provided by an elevation knob that is threaded in and out of the bottom of the swing arm. A pivot spring hole is located on the pivot arm and swing spring hole is located on the swing arm. A pivot spring is contained between the pivot spring hole and the swing spring hole. The pivot spring is to provide counter tension to the force applied by the elevation knob on the pivot arm.

Figure 1:
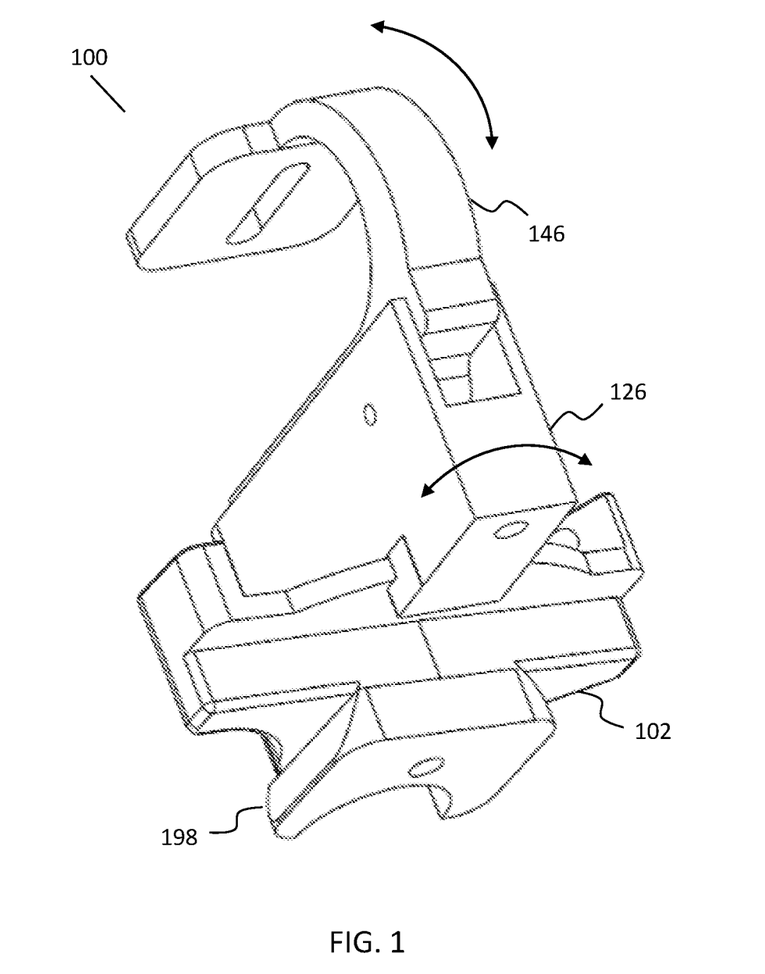
FIG. 1 illustrates a perspective view of an optics platform according to an example of the principles described herein.

Turning to FIG. 1, an example optics platform 100 is shown according to an example of the principles described herein. The optics platform 100 includes a base plate 102 with a swing arm 126 and pivot arm 146 attached thereon. In summary, the swing arm 126 is interlocked with the base plate 102 for fine incremental motion of the swing arm 126 relative to the base plate 102. The surface of the base plate 102 is generally flat and allows semi-circular motion of the swing arm 126 relative to the flat surface of the base plate 102, which surface will be referenced as a horizontal plane.

The optics platform 100 includes structure underneath the base plate 102, as discussed below, that allows for quick attachment or release of the optics platform 100 from a mount, such as a camera stand or tripod. In the example shown in FIG. 1, the structure underneath the base plate 102 is a ball mount attachment 198.

In motion, the pivot arm 146 and the swing arm 126 articulate together in a semi-circular path around a vertical axis and along the surface of the base plate 102. The pivot arm 146 articulates in a semi-circular path relative to the swing arm 126 around a horizontal axis. Movements of the pivot arm 146 and swing arm 126 are indicated by arrows in FIG. 1. The two movements may be asynchronous, or otherwise operate independently of each other, or they may move synchronously. In other words, the pivot arm 146 and the swing arm 126 may move together or the pivot arm 146 may move independently of the swing arm 126. The two movements are both relative to the base plate 102.

The pairing of the base plate 102 and the swing arm 126 is responsible for horizontal semi-circular motion of a device (such as a telescope, spotting scope, camera, or other optic) that is attached to the optics platform 100. The pairing of the swing arm 126 and pivot arm 146 is responsible for a vertical, semi-circular motion of the device. The swing arm 126 movement and the pivot arm 146 movement are controlled manually with independent controls for each movement. In other examples, the movements are controlled by a single structure.

Figure 2:
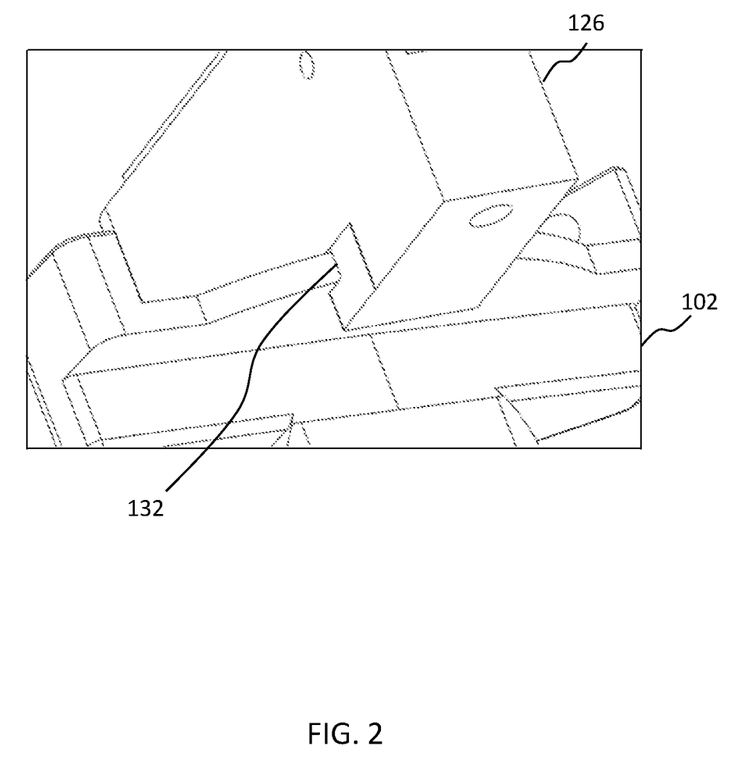
FIG. 2 illustrates a close-up perspective view of a swing arm and base plate of the optics platform according to an example of the principles described herein.

A close-up view of the slidable connection between the base plate 102 and the swing arm 126 is illustrated in FIG. 2. The swing arm 126 articulates or slides along the base plate 102. A notch 132 on the swing arm 126 slidably engages a lip of the base plate 102, restricting undesirable vertical movement of the swing arm 126 relative to the base plate 102. The notch 132 follows the semi-circular shape of the lip of the base plate 102 as it slides around the base plate 102. In this manner, movement of the swing arm 126 is parallel to the top and bottom surface of the lip for a precise, non-wobbling semi-circular path.

While other optics platforms may function only in an X, Y, and Z axis, the added semi-circular motion described herein, with multiple articulations and counter tension, provide the user with increased functionality and precision. The interlocking relationship between the swing arm 126 and the base plate 102, and the swing arm 126 and the pivot arm 146, provides control and stability for precise vertical and horizontal positioning along a swinging planar movement.

Figure 3:
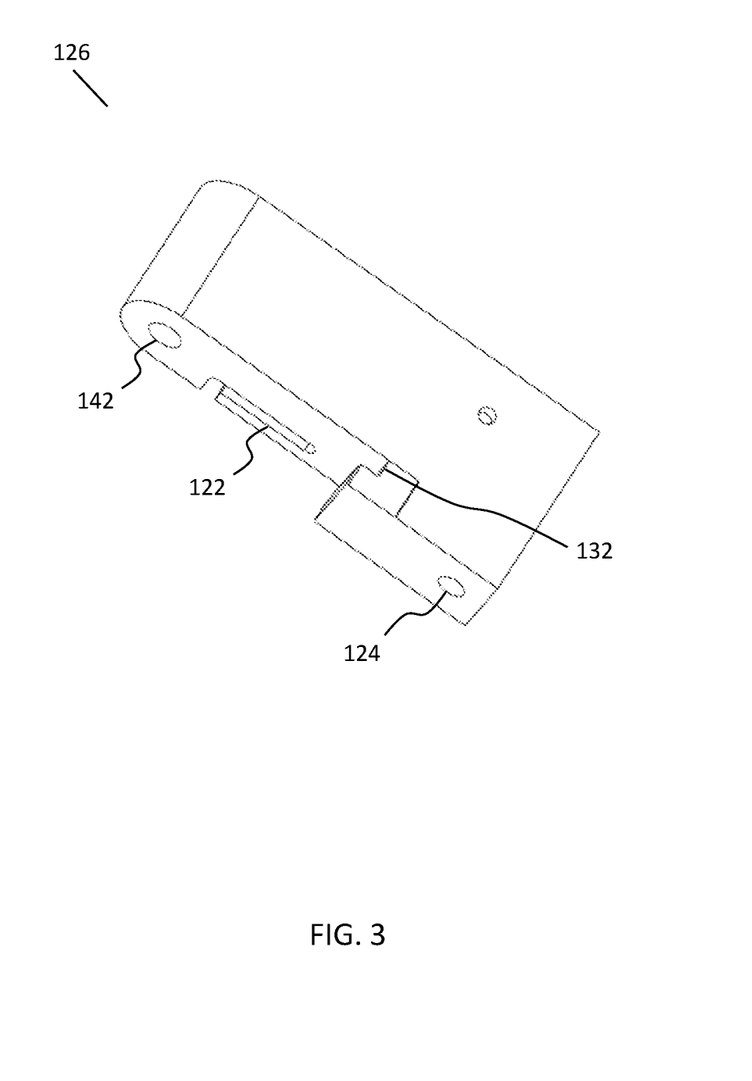
FIG. 3 illustrates a perspective view of a swing arm of the optics platform according to an example of the principles described herein.

Turning to FIG. 3, the swing arm 126 is shown separate from the base plate 102 and pivot arm 146. The swing arm 126 includes an elongate member with a swing pivot hole 142 at or near one end and an offset member at an opposite end. The offset member extends perpendicularly outward and has a notch 132 which is a t-slot or hook-like opening that slidably engages around the lip, or outer edge, of the base plate 102 to hold the swing arm 126 slidably engaged and prevent vertical movement while the swing arm 126 articulates about the base plate 102.

A slot 122 is located on the underside of the swing arm 126. The slot 122 includes an elongated cavity lengthwise along the underside of the swing arm 126. The slot 122 turns toward the side of the swing arm 126 at an end closest to the spring hole and pivot hole 142 so that it extends to an outer side of the swing arm 126. In this manner, an end of the pivot spring 158-1, -2 (FIG. 7) can be inserted through the opening at the side of the swing arm 126 and then slide within the slot 122 to engage the swing arm 126. In this manner, the end of the pivot spring 158-1, -2 (FIG. 7) is joined between the swing arm 126 and the base plate 102. Instead of a notch or slot, further examples include other restrictive structure that control movement along a horizontal path.

Figure 5:
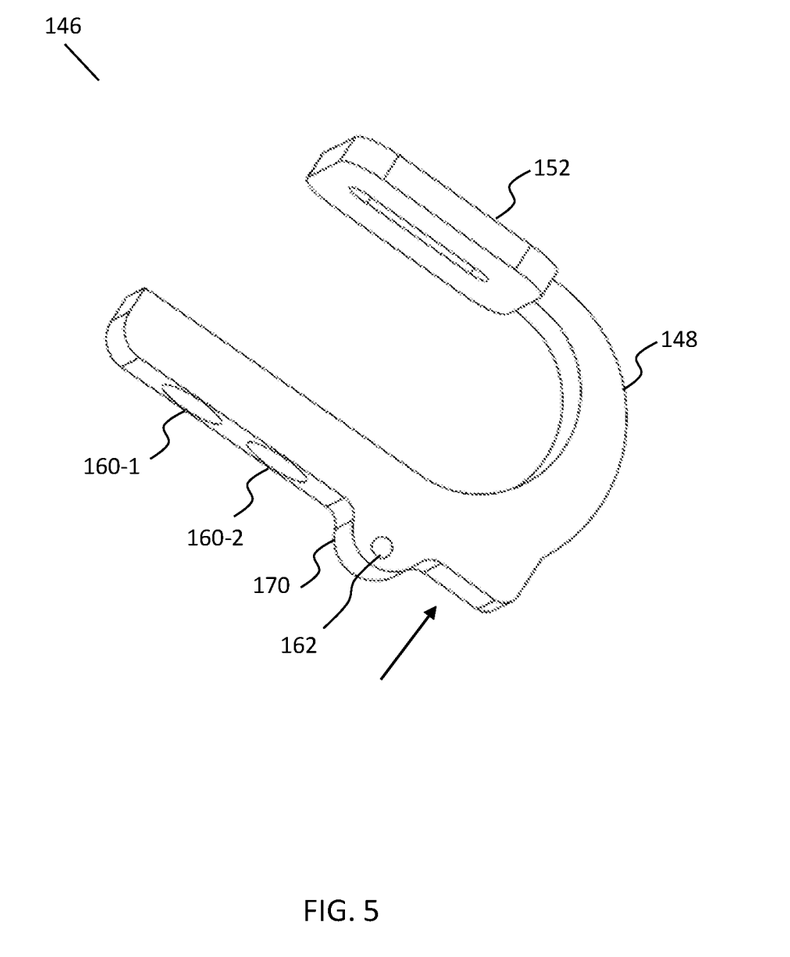
FIG. 5 illustrates a perspective view of a pivot arm of the optics platform according to an example of the principles described herein.

Also on the underside of the swing arm 126 is an elevation hole 124 in which a control (e.g., elevation knob 134, see FIG. 8) may be inserted to control movement of the pivot arm 146 (see FIG. 5).

Figure 4A:
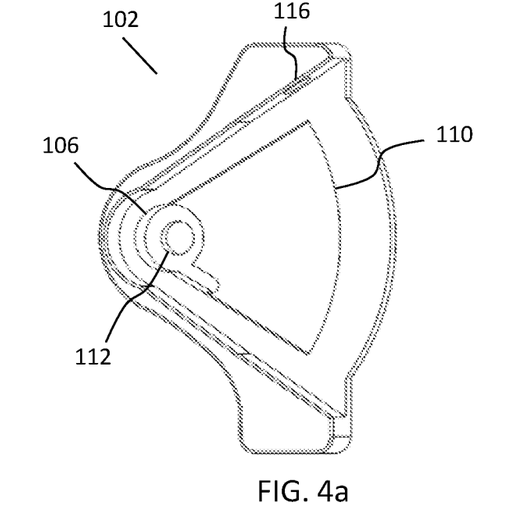
FIG. 4a illustrates a top view of a base plate of the optics platform according to an example of the principles described herein.

FIG. 4a illustrates an example base plate 102 as viewed from the top. The base plate 102 includes a generally flat member that includes a windage hole 116, base spring hole 106, base pivot hole 112, and pie-shaped recess 110. The base plate 102 is generally wedge-shaped or pie-shaped and the pie-shaped recess 110 follows the angles and curvature of the pie shape of the base plate 102.

Within the pie-shaped recess 110, the swing arm 126 (see FIG. 3) articulates as it swings back and forth from side to side. The swing arm 126 pivots from side to side as defined by sidewalls of the pie-shaped recess 110.

Figure 4B:
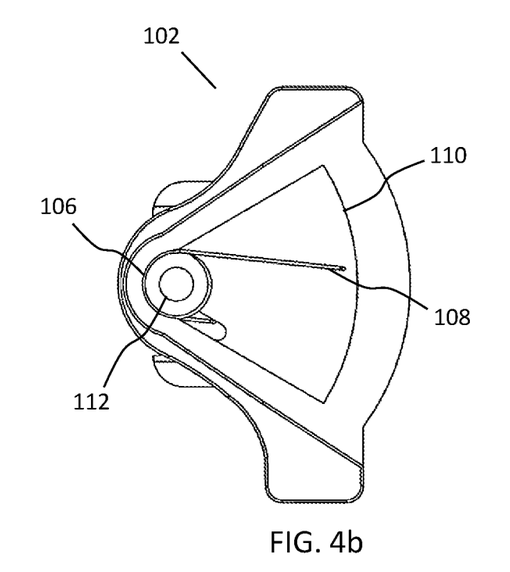
FIG. 4b illustrates a top view of a base plate of the optics platform according to an example of the principles described herein.

FIG. 4b illustrates a base spring 108 that is nested within the base spring hole 106. One end of the base spring 108 moves side to side in the pie-shaped recess 110 against movement of the swing arm 126. The base spring 108 provides counter tension against force applied to the swing arm 126 (see FIG. 3).

At or near an apex of the pie-shaped recess 110 is the corresponding base spring hole 106 to the pivot spring hole 142 on the swing arm 126 (see FIG. 3). The base spring hole 106 includes a circular recess within the flat member. Within the base spring hole 106 and centrally aligned with the base spring hole 106 is a base pivot hole 112, which is a hole that extends therethrough the base plate 102. The swing pivot hole 142 of the swing arm 126 (see FIG. 3) is to align with the base pivot hole 112 of the base plate 102 in order for the swing arm 126 to articulate around with respect to the base plate 102.

Turning to FIG. 5, an example pivot arm 146 is shown separate from the base plate 102 and swing arm 126. The pivot arm 146 includes an arm extension 148 and a top plate 152. The arm extension 148 includes an elongate member that extends outward and bends or curves around itself. The arm extension 148 shown in FIG. 5 curves completely around itself to form a U-shape with two end portions extending in a parallel direction. One end portion will be referred to as the bottom end portion. The other end portion will be referred to as the top end portion. The top end portion does not extend as far as the bottom end portion. In other examples, the top end portion extends at least as far as the bottom end portion or beyond the bottom end portion. In further examples, the curvature is not enough for the top end portion to completely curve around to be parallel with the bottom end portion.

The top plate 152 is a flat elongated member to support at least one external device, such as a camera or scope, etc. The space between the top end portion and top end plate 152 to the bottom end portion of the arm extension 148 is advantageous for dampening vibrations on an optics device. Vibrations may be caused by contact with the bottom end portion of the arm extension 148, the swing arm 126, and the base plate 102. The optics device is also isolated from experiencing the effects of vibrations or counter tension of biasing members, oscillations from a mount, movements associated with the elevation knob, etc.

On the bottom of the bottom end portion are pivot spring holes 160-1, -2 for spring attachment to the base plate 102. The pivot spring holes 160-1, -2 are cavities or recesses adjacent to the pivot pin hole 162. The pivot arm 146 receives at least one biasing member in at least one of the pivot spring holes 160-1, -2, that provides counter tension to the revolving motion. At least one pivot spring 158-1, -2 (see FIG. 8) is positioned between respective pivot spring holes 160-1, -2 and swing spring holes 144-1, -2 (see FIG. 6) within the swing arm 126 (see FIG. 6). The pivot spring 158-1, -2 provides the counter tension to the force applied at an end of the bottom end portion of the pivot arm 146. The use of one pivot spring or multiple pivot springs and the location of the pivot spring or pivot springs allows a different spring tension to be utilized. For different weights of the optical devices on the optics platforms, different spring tensions may be desired. For example, a weight balance desired for a spotting scope may be different than the weight balance desired for a camera and thus a spring tension can be configured accordingly.

In the example shown in FIG. 5, the pivot arm 146 includes a pivot attachment 170 on a bottom side of the pivot arm 146. The pivot arm 146 is pivotally attached to the swing arm 126 by a pivot pin 150 (see FIG. 8) such that a force exerted at or near the end of the bottom end portion, as indicated by the arrow, causes the pivot arm 146 to articulate around the horizontal axis through the pivot pin 150 in the swinging circular motion. The articulation angles the top plate 152 upward and downward relative to the base plate 102 (see FIGS. 4a and 4b). An external device attached to the top plate 152 may therefore be tilted upward and downward depending on the direction of rotation of the elevation knob 134 (see FIG. 8) or other force. The pivot arm 146 is contained within a cavity on top of the swing arm 126 housing to swing upward and downward relative to the pivot attachment 170.

Figure 6:
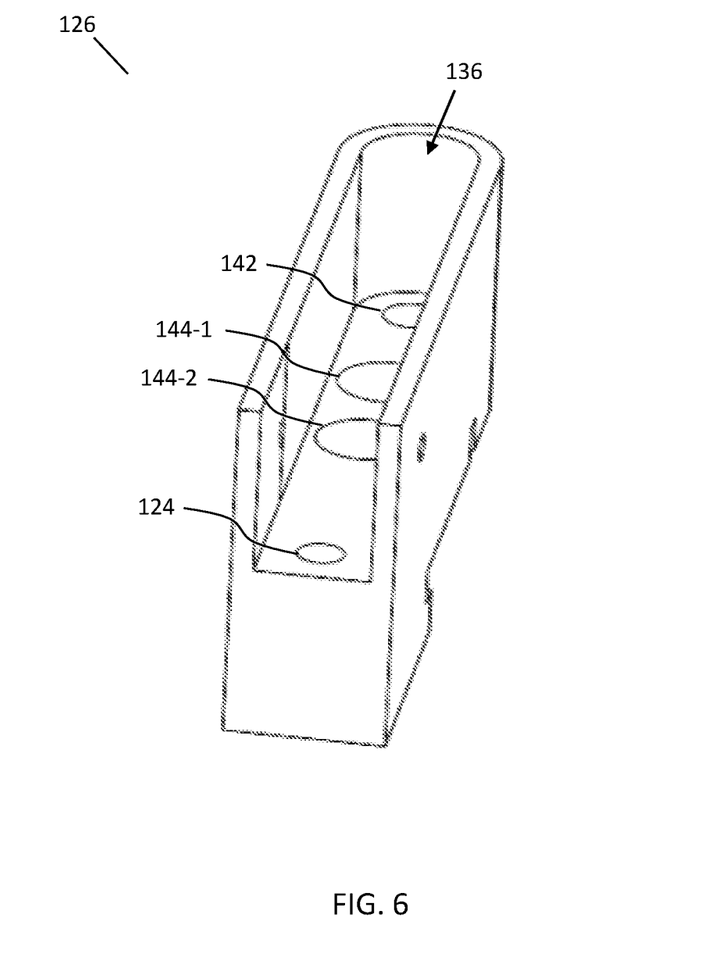
FIG. 6 illustrates a perspective view of a swing arm of the optics platform according to an example of the principles described herein.

In a top perspective view of the swing arm 126 as shown in FIG. 6, the top of the swing arm 126 is removed to show a cavity 136, or interior space, within which the pivot arm 146 is slidably placed against sidewalls of the swing arm 126. The sidewalls define the interior space and prevent undesirable horizontal movement of the pivot arm 146 as the pivot arm 146 is revolved around the horizontal axis of the pivot pin 150 (see FIG. 8) in a swinging motion. The pivot spring hole 142 can be seen within the cavity 136. Also, the elevation hole 124 that is threaded for the elevation knob 134 (see FIG. 8) may be seen within the cavity 136. FIG. 6 also depicts the swing spring holes 144-1, -2 that receive the pivot springs 158-1, -2 (FIG. 7) as described above.

Figure 7:
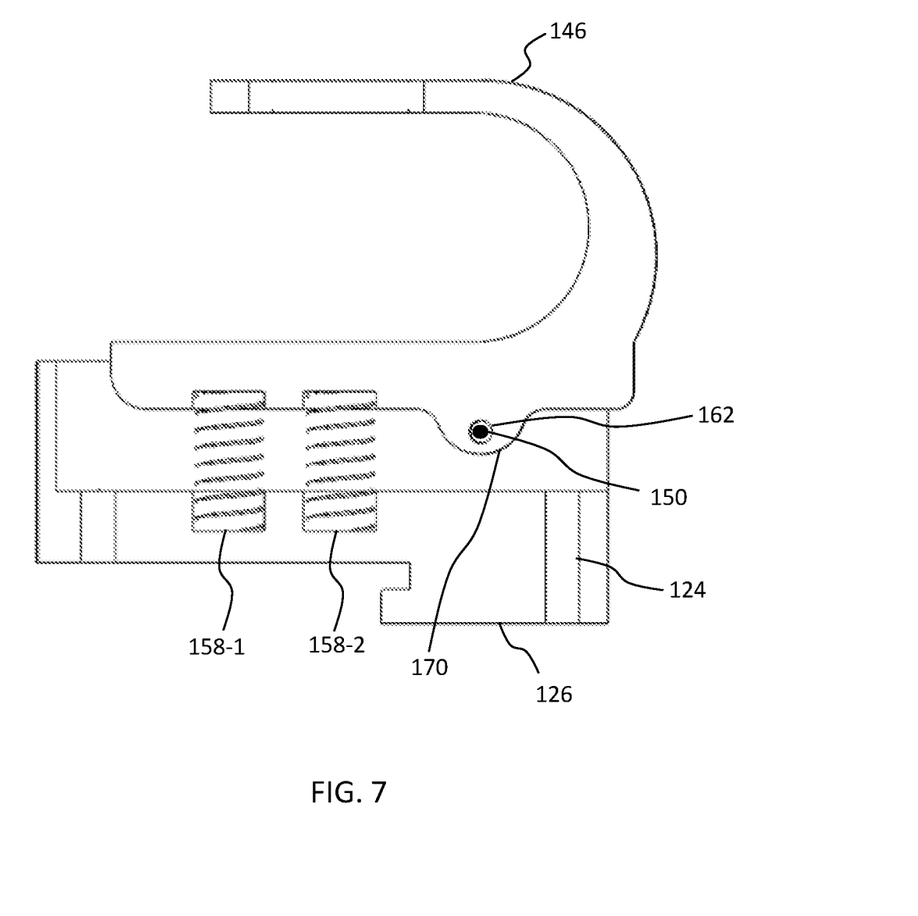
FIG. 7 illustrates a side cutout view of a swing arm and pivot arm according to an example of the principles described herein.

A side cutout view of the optic device is shown in FIG. 7. The pivot pin hole 162 runs perpendicular to the length of the arm attachment 148 at the pivot attachment 170. The pivot pin 150 is inserted within the pivot pin hole 162 and attaches at ends to interior sidewalls of swing arm 126. The pivot arm 146 pivots, or in other words, swings upward and downward around the horizontal axis as defined by the pivot pin 150 relative to the swing arm 126.

An elevation hole 124 extends vertically upward through the swing arm 126 starting at an end of the offset member.

The elevation hole 124 is threaded for the elevation knob 134 (see FIG. 8) to be screwed into and thereby exert force on the pivot arm 146.

Figure 8:
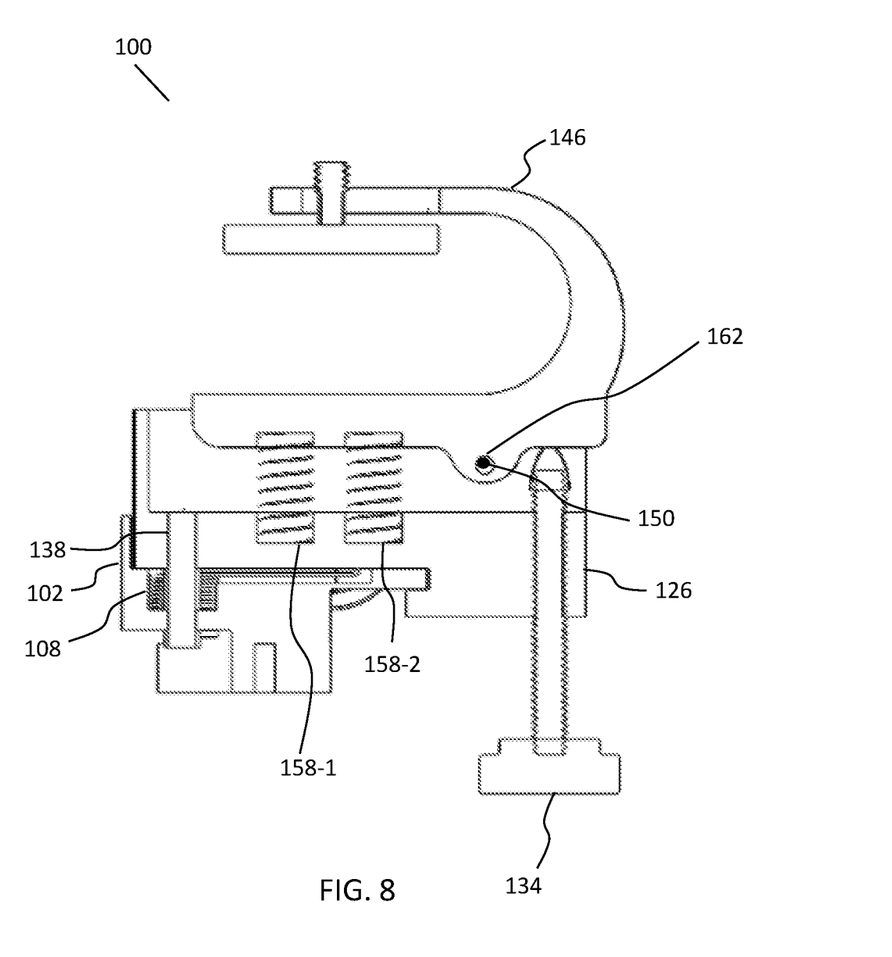
FIG. 8 illustrates a side cutout view of an optics platform according to an example of the principles described herein.

Turning to FIG. 8, a side cutout view of the optics platform 100 illustrates the pivot arm 146 attached to the swing arm 126 attached to the base plate 102 via a base pin 138 that extends between the base pivot hole 112 (see FIG. 4a) and the swing pivot hole 142 (see FIG. 3). The base pin 138 provides a vertical axis around which the swing arm 126 articulates relative to the base plate 102. The combination of fixation from the base pin 138 and the notch 132 on the swing arm 126 provides for horizontal semi-circular motion of the swing arm 126 relative to the base plate 102.

A base spring 108 is contained within the base spring hole 106 (see FIG. 4a). The base spring 108 is sandwiched between the base spring hole 106 and a corresponding swing pivot hole 142 (see FIG. 3) on the swing arm 126. The base spring 108 is under tension between the base spring hole 106 and the swing pivot hole 142 (see FIG. 3) and thereby exerts a spring tension between the swing arm 126 and the base plate 102 as the swing arm 126 pivots or articulates in a swinging motion around the base pivot hole 112.

The elevation knob 134 is rotated to apply an upward force on the pivot arm 146. At least one pivot spring 158-1, -2 provides counter tension as the pivot arm 146 articulates around the pivot pin 150. The pivot pin 150 is located in the pivot pin hole 162.

Figure 9:
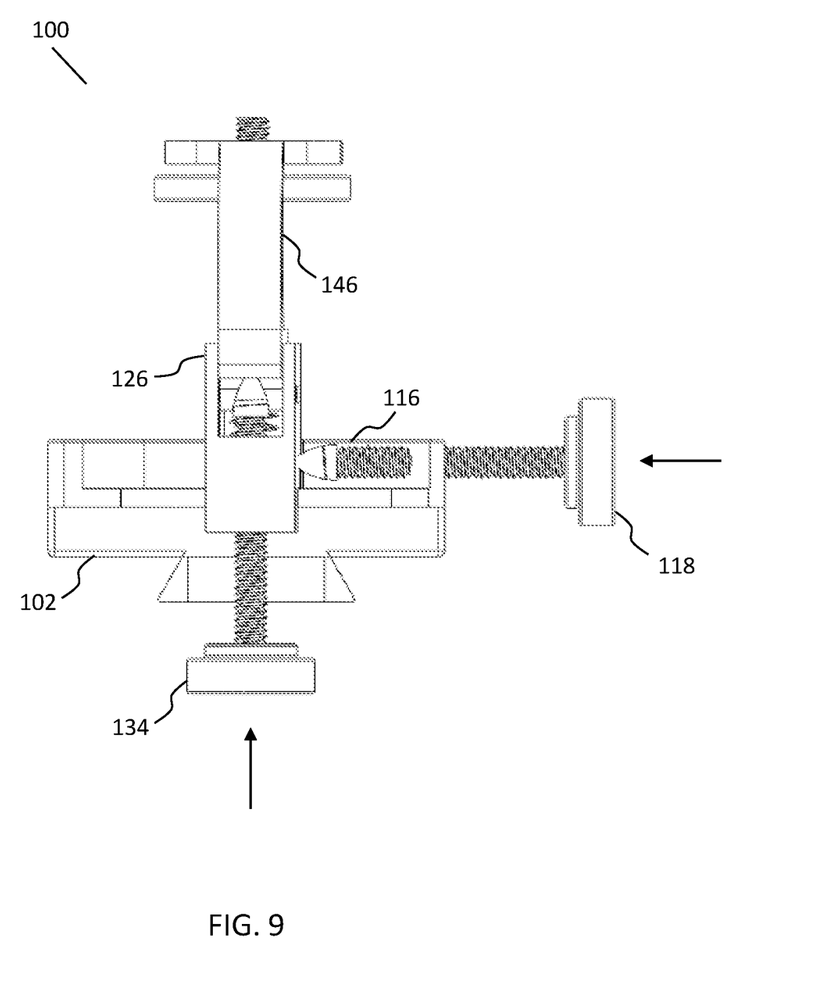
FIG. 9 illustrates a front cutout view of an optics platform according to an example of the principles described herein.

In FIG. 9, a front cutout view of the optics platform 100 shows the windage knob 118 connected to the side of the base plate 102. The windage knob 118 includes a threaded elongate member that is inserted within the windage hole 116 of the base plate 102. The windage knob 118 includes a knob or handle or other structure for manual application. Rotation of the windage knob 118 causes force to be exerted on the swing arm 126 at the point of contact which causes the swing arm 126 to move. The windage knob 118 is screwed in and out of the side of the base plate 102 to provide horizontal back and forth swing motion of the swing arm 126 that is precisely controlled. In an example, the swing arm 126 can return to an initial position against the side of the base plate 102 by unscrewing the windage knob 118 in a counterclockwise direction, under spring pressure that provides controlled movement. Movement away from the initial position against the side of the base plate 102 is performed by screwing the windage knob 118 in a clockwise direction under spring pressure. Counter tension against the forces of the windage knob 118 provide precision of movement of the windage knob 118.

Also shown in FIG. 9 is an elevation knob 134 that is screwed underneath a bottom side of the swing arm 126. The elevation knob 134 includes a threaded elongate member that is inserted with the elevation hole 124 (labeled in FIG. 7). The elevation knob 134 includes a knob or handle or other structure for manual application. Rotation of the elevation knob 134 causes force to be exerted on the pivot arm 146 at the point of contact which causes the pivot arm 146 to move. The elevation knob 134 is screwed in and out of the swing arm 126 to articulate the pivot arm 146 about the horizontal axis of the swing arm 126. In an example, the pivot arm 146 can return to an initial position within the swing arm 126 by unscrewing the elevation knob 134 in a counterclockwise direction, under spring pressure to provide controlled movement. Movement away from the initial position against the swing arm 126 is performed by screwing the elevation knob 134 in a clockwise direction under spring pressure. Counter tension against the forces of the elevation knob 134 provide precision of movement of the elevation knob 134.

Figure 10:
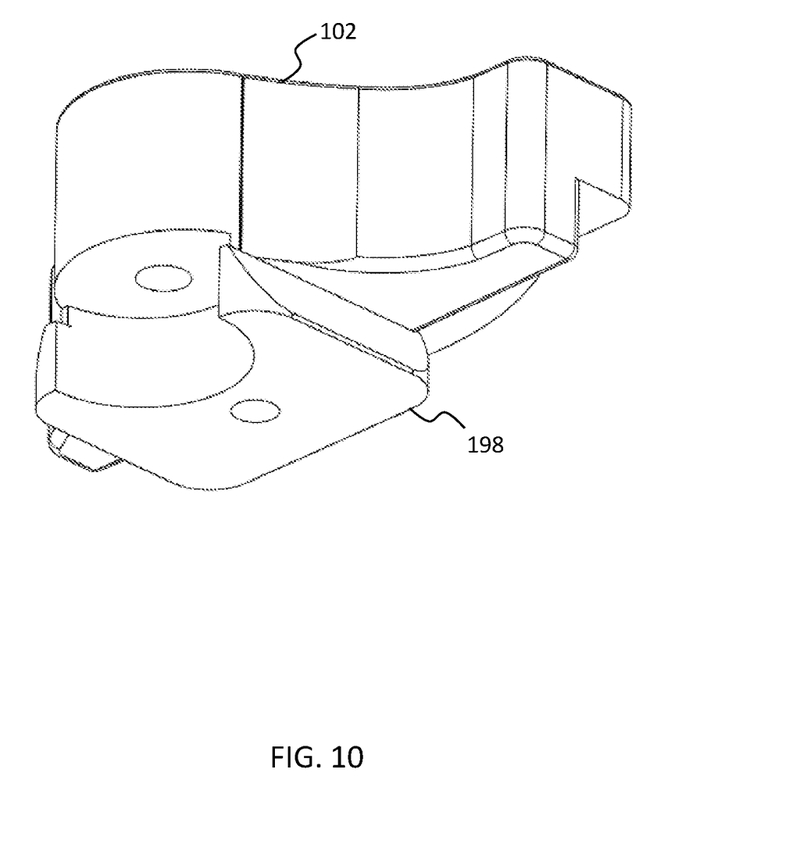
FIG. 10 illustrates a perspective view of a ball mount attachment of the optics platform according to an example of the principles described herein.

Turning to FIG. 10, an example attachment structure for the optics platform 100 in the form of a ball mount attachment 198 is shown. The ball mount attachment 198 is located underneath the base plate 102 and includes an attachment with curved arms that engage around a standard tripod and allow a secure mount of a device to a tripod.

Figure 11:
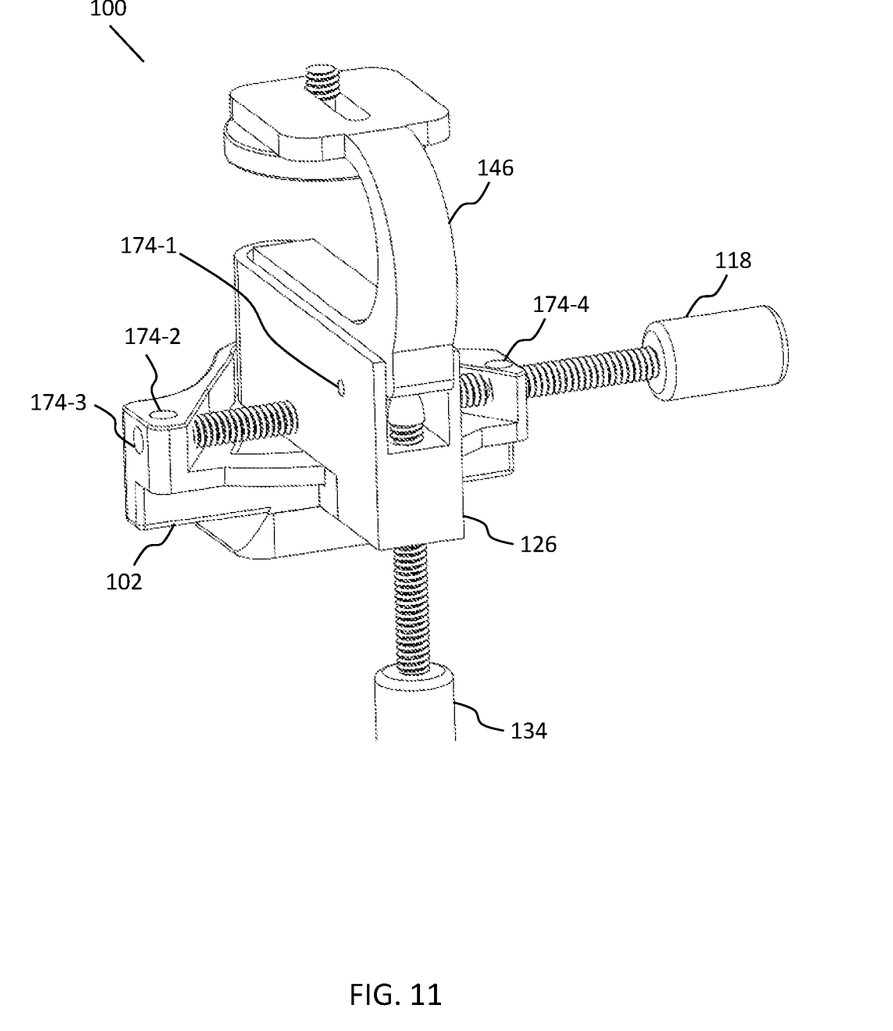
FIG. 11 illustrates a perspective view of the optics platform according to an example of the principles described herein.

In an example, the first or second harness includes structure that includes a barrel nut that restrict movement. Turning to FIG. 11, an example optics platform 100 includes barrel nuts 174-1, -2, -3, -4 that are used to tighten respective threaded portions of the windage knob 118 and the elevation knob 134. Particularly, barrel nut 174-1 is screwed into the swing arm 146 to provide tightness around threaded portion of elevation knob 134. Barrel nut 174-2 is screwed into the base plate 102 to provide tightness around threaded portion of windage knob 118. Barrel nut 174-3 is screwed into the base plate 102 to provide tightness around threaded portion of windage knob 118. Barrel nut 174-4 is screwed into the base plate 102 to provide tightness around threaded portion of windage knob 118. The barrel nuts 174-1, -2, -3, -4 allow linear movement of the swing arm 126 on the threaded, fixed windage knob 118 and elevation knob 134. The barrel nuts 174-1, -2, -3, -4 move via threads on the windage knob 118 and elevation knob 134. The round barrel nut rotation of barrel nuts 174-1, -2, -3, -4 accommodates the angle changes as the swing-arm moves move along a straight threaded knob. Minor elliptical cuts not shown in the diagram make this linear motion possible. Note that barrel nuts may be located in other locations to provide tightness and securement to threaded portions of the various control features.

Figure 12:
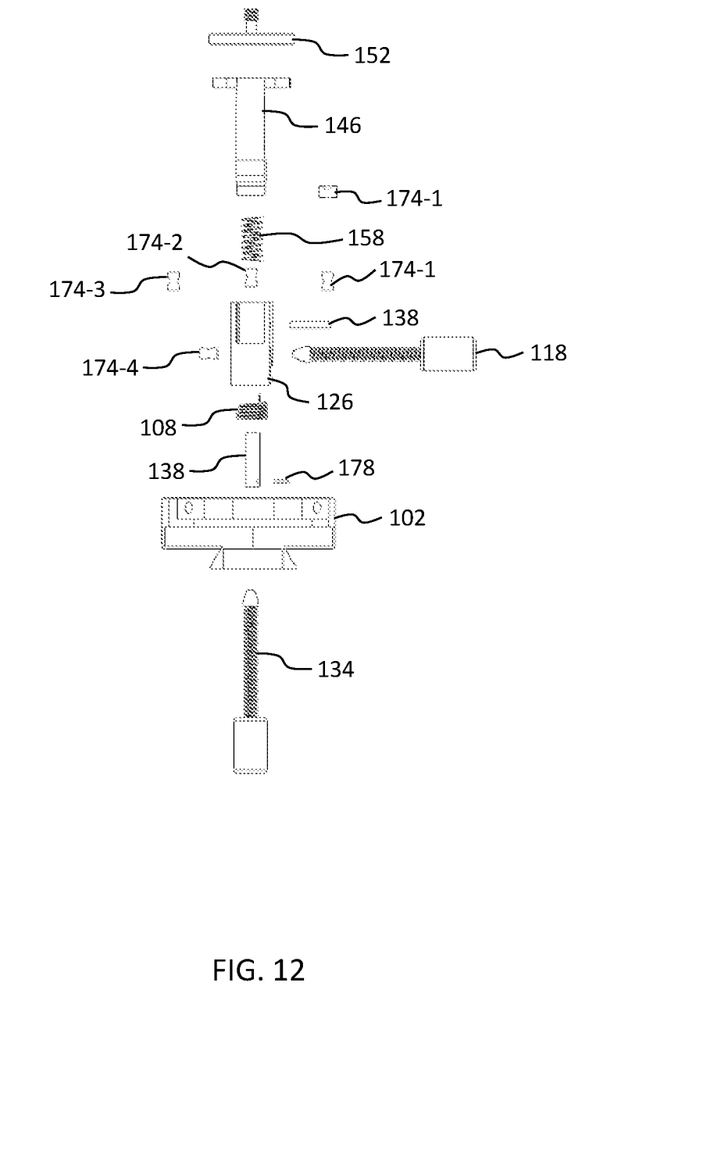
FIG. 12 illustrates an exploded side view of the optics platform according to an example of the principles described herein.

FIG. 12 illustrates an exploded view of the various components including base plate 102, swing arm 126, pivot arm 146, windage knob 118, elevation knob 134, top plate 152, pivot spring 158, base spring 108, base pin 138, barrel nuts 174-1, -2, -3, -4. A stay pin 178 pins the base pin 138 to the base plate 102. It prevents the base pin 138 from slipping out during rotation of the swing arm 126.

In an example, the first or second harness includes structure such as at least one threaded bolt, worm gear, linear accelerating device, or other type of structure. In an example, two clamping arms interface with the swing arm 126 via a pin that is affixed through the pivot hole of the base plate 102 to control movement of the swing arm 126. In another example, the first or second harness is placed in the body of the swing arm 126 at the pivot hole to control movement of the pivot arm 146. In both scenarios, the first and second harness may allow forward and reverse motion through the threaded pivot hole. Thus, the movement of the swing arm and pivot arm may be controlled via a springless adjust system.

The springs are types of biasing members that counter the forces on the pivot arm 146 and the swing arm 126. In an example, the biasing members may include additional structures than the examples already disclosed. The biasing members for the pivot arm 146 and the swing arm 126 may be the same or different. At least one biasing member may include a spring or spring-like member. The biasing member is to resist the force applied at or near a second end of the arm extension 148 as the arm extension 148 pivots. The biasing member provides resistance of pivot arm 146 movement which enables a user to fine tune a position of the pivot arm 146 relative to the swing arm 126.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An optics platform, comprising:
a base plate;
a swing arm, pivotally attached to the base plate to articulate in a semi-circular motion around a vertical axis of the base plate;
a pivot arm, pivotally attached to the swing arm to articulate in a semi-circular motion around a horizontal axis of the swing arm; and
a windage knob screwed through the base plate to contact a side of the swing arm and thus provide a horizontal force that facilitates the semi-circular motion of the swing arm, the semi-circular motion being parallel to a surface plane of the base plate.

2. The optics platform of claim 1, the base plate comprising:
a base spring hole;
a base pivot hole and a base pin within the base spring hole, the base pin to pivotally attach the swing arm to the base plate through the base pivot hole; and
a base spring within the base spring hole to apply a spring counter force against a force applied to articulate the swing arm around the base pin and base plate.

3. The optics platform of claim 1, the base plate comprising:
a pie-shaped base member;
a base pivot hole at or near an apex of the pie-shaped base member;
a swing pivot hole on an underside of the swing arm; and
a base pin inserted within the base and swing pivot hole, the base and swing pivot holes being in alignment, the base pin to pivotally attach the base plate and the swing arm.

4. The optics platform of claim 1, further comprising:
a swing pivot hole in the swing arm;
a base pivot hole in the base plate, the swing arm and the base plate positioned with the swing pivot hole in alignment with the base pivot hole; and
a base pin inserted within the swing pivot hole and the base pivot hole, the base pin and alignment of the swing pivot hole and the base pivot hole providing the vertical axis on which the swing arm articulates relative to the base plate.

5. The optics platform of claim 1, the swing arm comprising:
an elongate member, and
a notch on the elongate member which slidably engages around an end of the base plate, the notch to hold the swing arm slidably engaged to the base plate as the swing arm articulates relative to the base plate.

6. The optics platform of claim 1, the pivot arm comprising:
an arm extension that pivotally attaches to the swing arm, and
a top plate at an end of the arm extension to support at least one external device.

7. The optics platform of claim 1, the pivot arm comprising:
an arm extension, and
a pivot attachment on a bottom side of the arm extension, the pivot arm to be pivotally attached by the pivot attachment to the swing arm, a force applied at or near an end of the arm extension to cause the pivot arm to articulate relative to the pivot attachment.

8. The optics platform of claim 7, the pivot arm further comprising:
a biasing member to provide a counter force to the force applied at or near an end of the arm extension of the pivot arm, the force and counter force to enable precise movement of the pivot arm relative to the swing arm.

9. The optics platform of claim 8, the biasing member comprising:
a pivot spring contained between a pivot spring hole of the pivot arm and a swing spring hole of the swing arm, the spring to provide the counter force to the force at or near the end of the arm extension of the pivot arm.

10. An optics platform, comprising:
a base plate;
a swing arm, pivotally attached to the base plate to articulate in a semi-circular motion around a vertical axis of the base plate;
a pivot arm, pivotally attached to the swing arm to articulate in a semi-circular motion around a horizontal axis of the swing arm;
a first harness that constrains movement of the swing arm to be in a horizontal plane relative to the base plate;
a second harness that constrain movement of the pivot arm to be in a vertical plane relative to the swing arm;
a first biasing member that counters a horizontal force on the swing arm; and
a second biasing member that counters a vertical force on the pivot arm.

11. The optics platform in claim 10, the first and second harnesses comprising interlocking end members on the swing arm and base plate, the interlocking end members to interlock the swing arm with the base plate and the pivot arm with the swing arm, respectively.

12. The optics platform in claim 10, the first and second biasing members comprising springs, the spring of the first biasing member configured to provide a tension against the swing arm movement, the spring of the second biasing member configured to provide a tension against the pivot arm movement.

13. The optics platform in claim 10, wherein the horizontal force on the swing arm is provided by a windage knob that is threaded through a sidewall of the base plate.

14. The optics platform in claim 10, wherein the vertical force on the pivot arm is provided by an elevation knob that is threaded through the swing arm.

15. The optics platform in claim 10, the pivot arm further comprising a top plate that is to support an external device.

16. The optics platform in claim 10, the base plate further comprising a ball mount attachment on a bottom side to attach to a tripod.

17. An optics platform, comprising:
a base plate, the base plate comprising a generally flat pie-shaped base member with at least one sidewall on a side of the base plate;
a swing arm, pivotally attached to the base plate to articulate in a semi-circular motion around a vertical axis of the base plate;

a pivot arm, pivotally attached to the swing arm to articulate in a semi-circular motion around a horizontal axis of the swing arm;

a top plate attached to the pivot arm, the top plate to support at least one external device;

a first harness that constrains movement of the swing arm to be in a horizontal plane relative to the base plate, the first harness comprising:

a windage knob on a sidewall at or near a corner end of the base plate, the windage knob to provide a horizontal force on the swing arm;

a base spring hole at or near an apex of the pie-shaped base of the base plate, the base spring hole to contain a base spring that provides counter tension to the horizontal force applied by the windage knob;

a base pivot hole within the base plate, the base pivot hole having a pin therethrough which pivotally attaches the base plate and the swing arm, the pin providing a vertical axis for the swing arm to articulate relative to the base plate;

a notch on the swing arm, the notch to slidably engage around an end of the base plate and thereby isolate movement of the swing arm to a horizontal plane;

a second harness, the second harness comprising:

a pivot attachment on a bottom side of the pivot arm, the pivot attachment to pivotally attach the pivot arm to the swing arm;

an elevation knob that is threaded through the pivot arm to provide a force on the pivot arm and thereby articulate the pivot arm; and a swing spring hole on the swing arm and pivot spring hole on the pivot arm, and a pivot spring contained between the swing spring hole and the pivot spring hole, the pivot spring to provide counter tension to the force applied by the elevation knob on the pivot arm.

18. The optics platform of claim 17, the base plate comprising a pie-shaped recess, wherein the pivot arm is nested within the pie-shaped recess, the swing arm to pivot frown side to side of the base plate as defined by sidewalls of the pie-shaped recess.

* * * * *